United States Patent [19]

Fix

[11] Patent Number: 4,731,916

[45] Date of Patent: Mar. 22, 1988

[54] METHOD OF REMOVAL OF OUTRIGGER BOX ON CRANES

[75] Inventor: Robert L. Fix, Hagerstown, Md.

[73] Assignee: Kidde, Inc., Saddle Brook, N.J.

[21] Appl. No.: 923,605

[22] Filed: Oct. 27, 1986

Related U.S. Application Data

[62] Division of Ser. No. 535,411, Sep. 26, 1983, Pat. No. 4,664,411.

[51] Int. Cl.⁴ .................... B23P 19/00

[52] U.S. Cl. .................... 29/426.3; 29/426.5; 29/469

[58] Field of Search .................... 29/426.3, 426.5, 469; 212/189; 280/763.1, 765.1, 766.1

[56] References Cited

U.S. PATENT DOCUMENTS

| | | | |
|---|---|---|---|
| 3,007,717 | 11/1961 | Noly | 280/765.1 |
| 3,332,699 | 7/1967 | Devys | 280/763.1 X |
| 3,825,095 | 7/1974 | Clark | 280/766.1 X |
| 3,836,012 | 9/1974 | Grider et al. | 212/189 |
| 3,937,337 | 2/1976 | Driving | 280/763.1 X |
| 4,146,250 | 3/1979 | Den Herder | 280/765.1 |
| 4,165,005 | 8/1979 | Jokinen | 212/189 |
| 4,280,267 | 7/1981 | Christensen | 29/426.3 |
| 4,394,912 | 7/1983 | Epps et al. | 280/765.1 X |
| 4,454,952 | 6/1984 | McGhie | 280/766.1 X |
| 4,524,873 | 6/1985 | McGowan | 29/426.3 X |

FOREIGN PATENT DOCUMENTS 1038412 8/1958 Fed. Rep. of Germany ... 280/766.1

OTHER PUBLICATIONS

Pierce Pacific, 2 pages from an undated brochure, Titled "Midship Outrigger Tunnel Removal Procedure".

*Primary Examiner*—Charlie T. Moon
*Attorney, Agent, or Firm*—Brady, O'Boyle & Gates

[57] ABSTRACT

A pair of fixed parallel transport rails for the outrigger box of a mobile crane are installed at the bottom of the crane chassis frame. The outrigger box is held on the chassis frame by four removable tapered pins. One jack cylinder on the outrigger box is trunnion mounted so that it can be tilted to clear the bottom of the chassis frame during removal and installation of the outrigger box. The outrigger box is equpped with transport track engaging rollers. To remove the outrigger box from the crane chassis, the box is unweighted to allow ready removal of the tapered pins. The outrigger box is then lowered until its rollers are resting on the two transport rails. A collar which retains the trunnion mounted jack cylinder of the outrigger box upright is released, and that jack cylinder is lowered to a stabilized inclined position where it can pass under the chassis frame. The outrigger box is then moved in one longitudinal direction along the transport tracks until the rollers near the end of the outrigger box having the trunnion mounted jack cylinder engage end stops on the tracks. The outrigger box is then lifted from the tracks and set aside in a desired manner.

8 Claims, 12 Drawing Figures

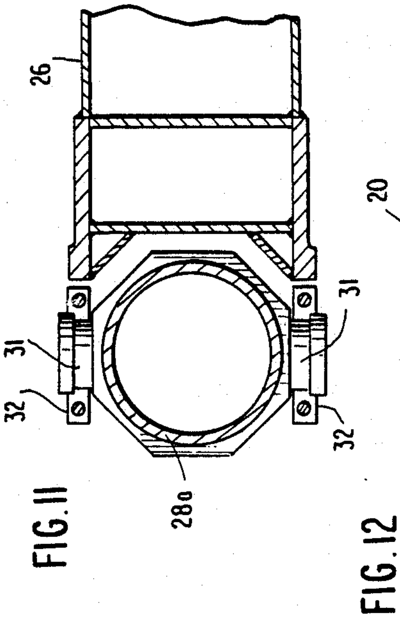
FIG.11
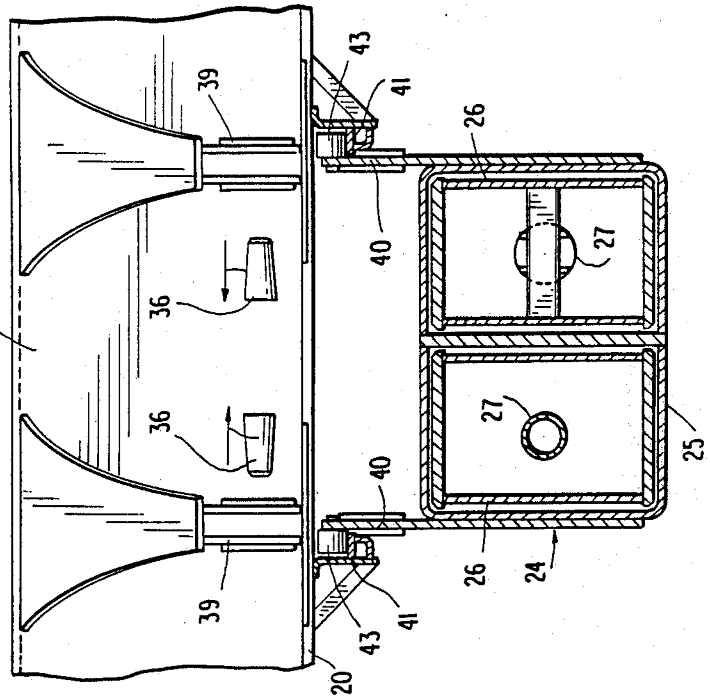
FIG.12
FIG.9
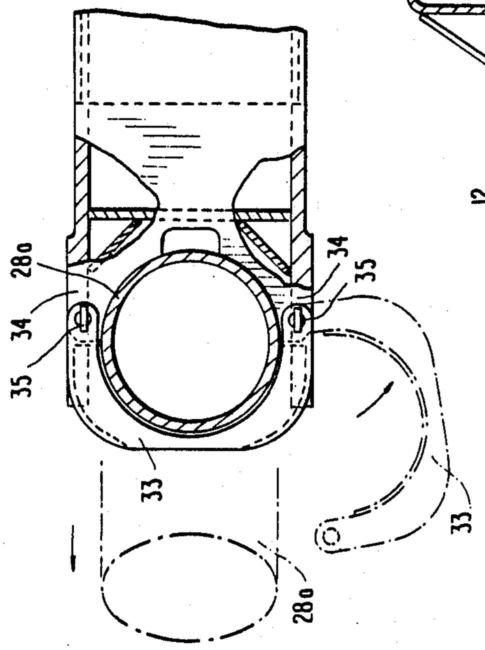
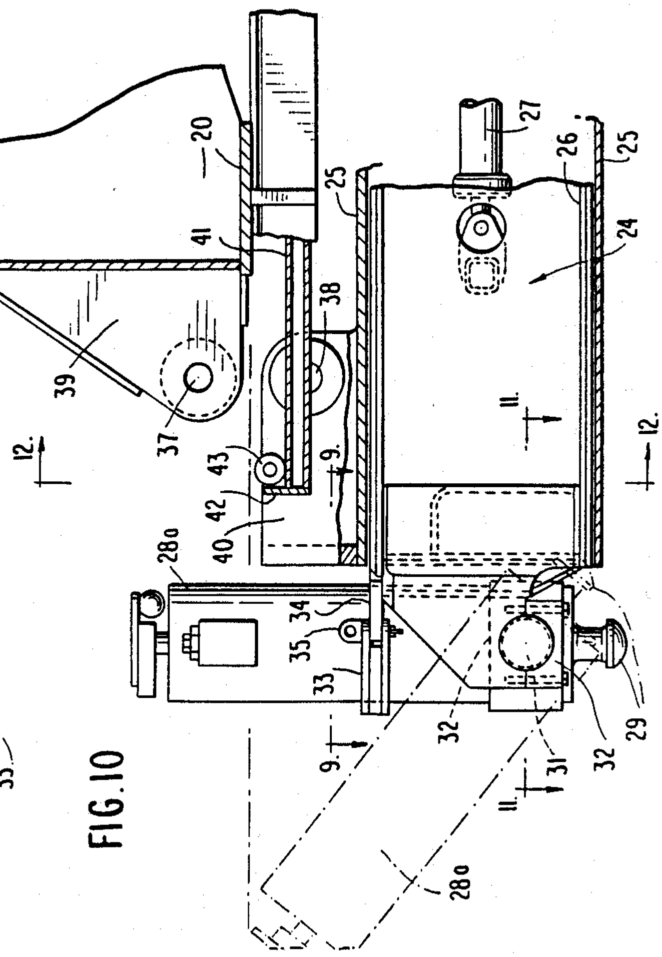
FIG.10

METHOD OF REMOVAL OF OUTRIGGER BOX ON CRANES

This is a division, of application Ser. No. 535,411, filed 9/26/83, now U.S. Pat. No. 4,664,411.

BACKGROUND OF THE INVENTION

In the prior art, removal of the outrigger box or housing from the chassis of a mobile crane is a time-consuming and laborious task. Since the fixed upright jack cylinders at opposite ends of the outrigger box block longitudinal movement of the box relative to the crane chassis, it is necessary to remove at least one of the extremely heavy jack cylinders before the outrigger box can be shifted and removed. Other methods of removal and installation of outrigger boxes are equally inconvenient, time consuming and costly.

Accordingly, it is the objective of the present invention to provide a simplified, convenient and much less laborious and time consuming method of removing and installing outrigger boxes of cranes. A related objective of the invention is to modify the conventional construction of the outrigger assembly in such a manner that the simplified and convenient removal and installation of the assembly is rendered possible and expeditious.

Another object of the invention is to provide a method of removal and installation of the outrigger box which involves only four simple procedures or steps carried out in sequence to remove the outrigger box, and carried out in reverse sequence to install the box on the crane chassis.

Other objects and advantages of the invention will become apparent to those skilled in the art during the course of the following detailed description.

BRIEF DESCRIPTION OF THE DRAWINGS

FIG. 9 is an enlarged fragmentary horizontal section taken on line 9—9 of FIG. 10.

FIG. 10 is an enlarged fragmentary side elevation, partly in vertical seetion, showing the outrigger assembly lowered from the chassis frame and engaged through its rollers with the transport tracks on the chassis frame.

FIG. 11 is an enlarged fragmentary horizontal section taken on line 11—11 of FIG. 10.

FIG. 12 is a fragmentary vertical section taken on line 12—12 of FIG. 10.

DETAILED DESCRIPTION

Figure 1:
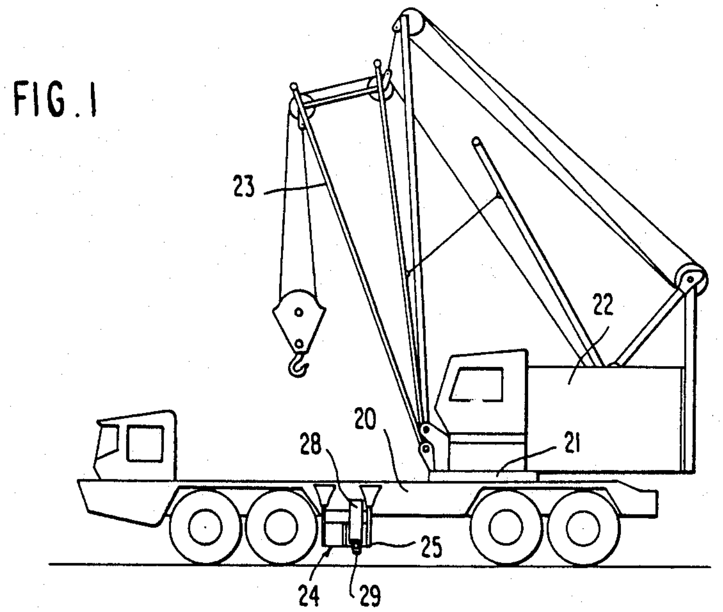
FIG. 1 is a side elevation of a mobile lattice crane having a readily removable and installable outrigger box in accordance with the present invention method and apparatus.

Referring to the drawings in detail, wherein like numerals designate like parts, a mobile lattice crane shown in FIG. 1 includes a chassis frame 20 on which is mounted through a turntable 21, a crane superstructure 22 including a lattice type crane boom 23 and associated conventional components. A readily removable crane outrigger assembly 24 in accordance with the main subject matter of this invention is removably mounted transversely beneath the chassis frame 20 in a manner to be completely described.

The outrigger assembly 24 comprises a rectangular box or housing 25 within which are slidably mounted in parallel relationship for movement in opposite longitudinal directions a pair of outrigger beams 26, each having a horizontal operating cylinder 27 of conventional construction connected therewith. Each outrigger beam 26 on its exterior end beyond the confines of the box 25 carries an upright jack cylinder 28, 28*a*. The jack cylinders at their lower ends have vertically extensible and retractable swivel extensions 29 to which are attached ground engaging feet or pads which have been removed from the elements 29 in the drawings. The elements 29 and the ground engaging pads are conventional.

In the present invention, the jack cylinder 28 is rigidly held on its outrigger beam 26 through conventional rigid holding means 30 carried by the outrigger beam. The opposite end jack cylinder 28*a*, however, is pivotally mounted on its outrigger beam 26 through trunnions 31, FIG. 11, which are rotatably held by conventional bearing structure 32 carried by the adjacent end of outrigger beam 26.

The pivoted jack cylinder 28*a* is normally held upright by a rigid embracing collar 33, which at proper times can be released and swung open to a position shown in phantom lines in FIG. 9 to allow tilting of the jack cylinder 28*a* to the inclined position shown in phantom lines in FIG. 10. In such position, the top of jack cylinder 28*a* can clear the bottom of chassis frame 20 during the removal or installation process for the outrigger assembly.

The retaining collar 33 for jack cylinder 28*a* is pivotally coupled to fixed flanges 34 by removable pins 35. One or both of these pins can be pulled, as desired, allowing the collar 33 to swing open or to be completely removed, in some cases.

The outrigger assembly 24 is removably supported on the chassis frame 20 by pairs of tapered pins 36 which are installed outwardly through registering apertures 37 and 38 formed, respectively, in opposite side lugs 39 of the chassis frame 20 and opposite end upstanding plate extensions 40 of the outrigger box 25. The lugs 39 straddle the plate extensions 40 when connected therewith by tapered pins 36. The pins 36 then bear the full weight of the qutrigger assembly 24 and are under heavy shear loads.

An important aspect of the invention is the provision on the bottom of chassis frame 20 close to the opposite side walls of the assembly 24 of a pair of fixed parallel horizontal support and guide tracks 41 for the outrigger assembly 24. These guide tracks are rigid with the chassis frame 20. At their opposite ends, the two guide tracks 41 have upright stop plates 42 fixed thereto, for a purpose to be described.

On the plate extensions 40 of the outrigger assembly or box adjacent to the swingable jack cylinder 28*a* is a pair of live rollers 43 adapted to engage and roll along the tracks 41. The opposite end of the plate extensions 40 similarly carry dead rollers or studs 44 also adapted to engage the tracks 41 at proper times.

Figure 7:
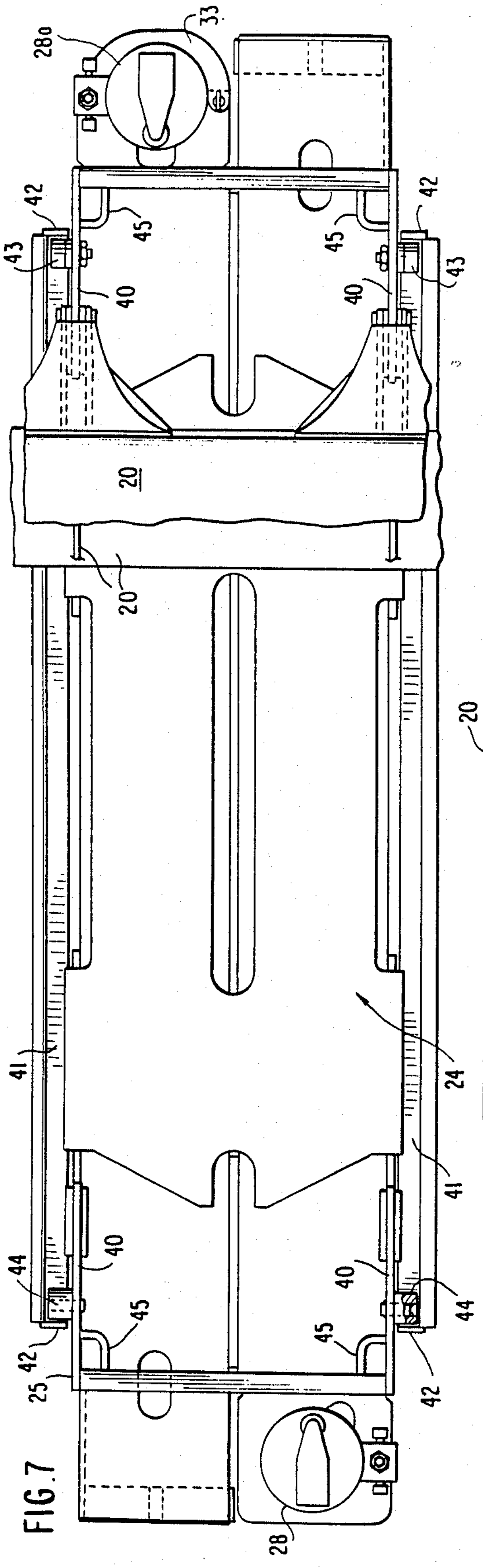
FIG. 7 is a fragmentary plan view of the outrigger assembly and chassis mounted transport rails for the assembly.
Figure 8:
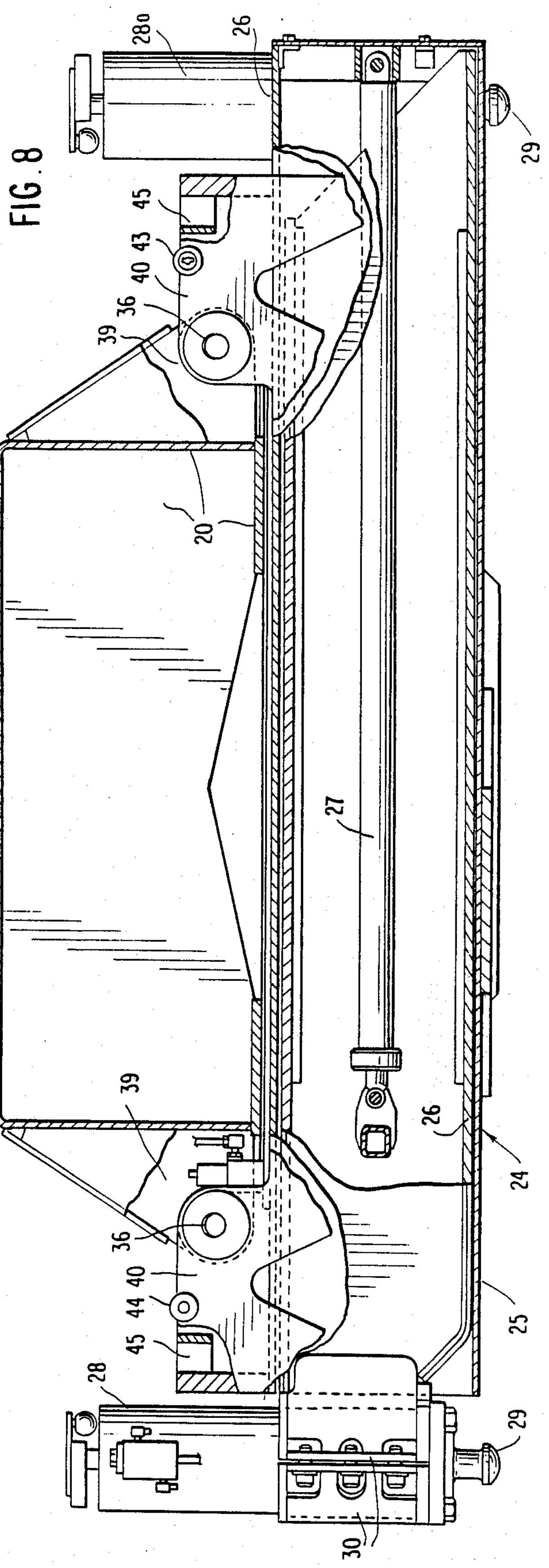
FIG. 8 is an enlarged transverse vertical section taken substantially on line 8—8 of FIG. 2, parts in elevation and parts broken away.

Rigid connector elements 45 for lifting cables operated by the crane are fixed in the four upper corners of the outrigger assembly as shown in FIGS. 7 and 8. The construction of the crane and the outrigger assembly 24 is otherwise conventional, and therefore need not be described in greater detail for a proper understanding of the invention.

Figure 2:
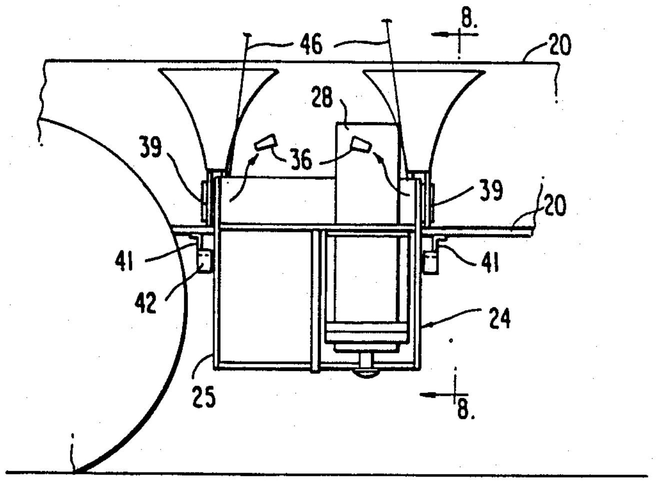
FIG. 2 is an enlarged fragmentary partly exploded side elevation of the crane adjacent to one end of the outrigger assembly and depicting its mounting on the crane chassis frame.
Figure 3:
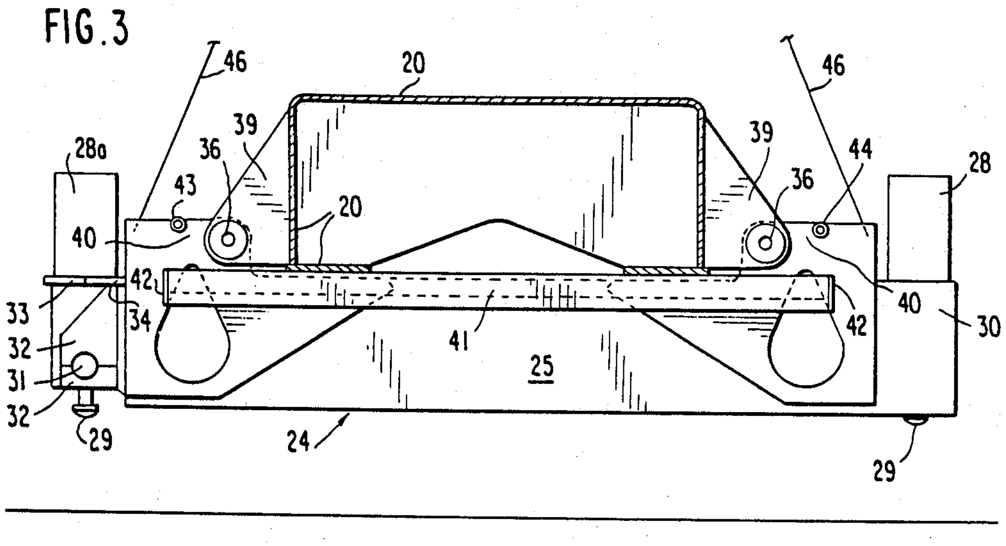
FIGS. 3 through 6 are partly schematic side elevations of the removable outrigger assembly in its relationship to the crane chassis frame during the four method steps involved in the removal of the assembly.
Figure 4:
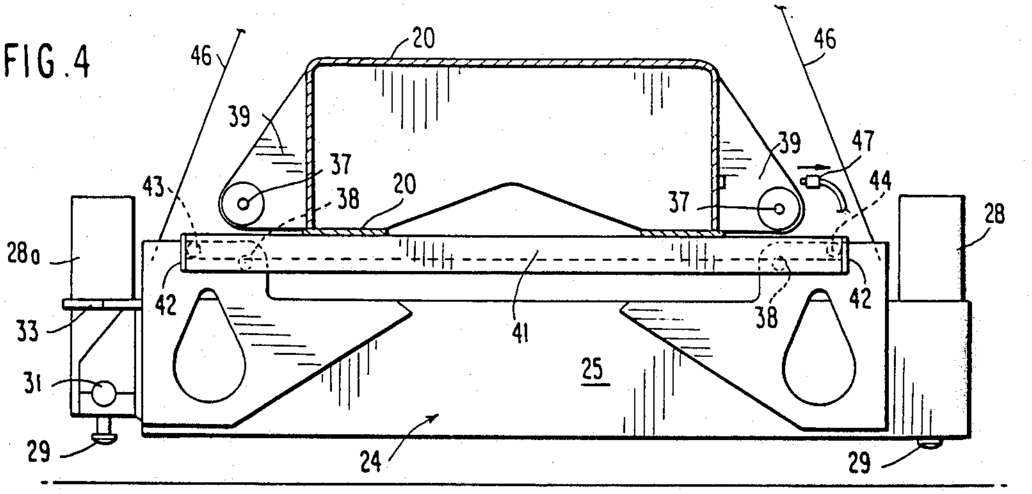

The method of removal of the outrigger assembly 24 from the crane chassis frame 20 comprises the following:

First, as shown in FIG. 3, lifting cables 46 controlled by the crane hook block are attached to the connectors 45 near opposite ends of the outrigger assembly. Two hydraulic links which supply and return hydraulic fluid from the horizontal operating cylinders 27 and the jack cylinders 28 and 28*a*, and one electrical conduit which supplies electrical power to the solenoid operated control valves in the hydraulic lines on the outrigger assembly, all of which have quick disconnect connectors on the ends thereof and which are schematically illustrated at 47 in FIG. 4 as a single element, are disconnected from the corresponding lines on the chassis frame. By means of the cables 46, the assembly is unweighted to relieve the shear loads on the pins 36 so that the latter can be removed, as shown in FIGS. 2 and 12, toward the center of the outrigger assembly. Once removed, the outrigger assembly is carefully lowered by the cables 46 until the live rollers 43 and dead rollers 44 rest on and are supported by the guide tracks 41.

Secondly, one or both of the pins 35 are pulled so that the collar 33 can be swung open or totally removed. The adjacent jack cylinder 28*a* is then carefully pivotally lowered to its inclined position where its lower extension element 29, FIG. 10, will solidly engage the adjacent end face of the outrigger beam. The jack cylinder 28*a* will remain stably in this position until again elevated.

Figure 5:
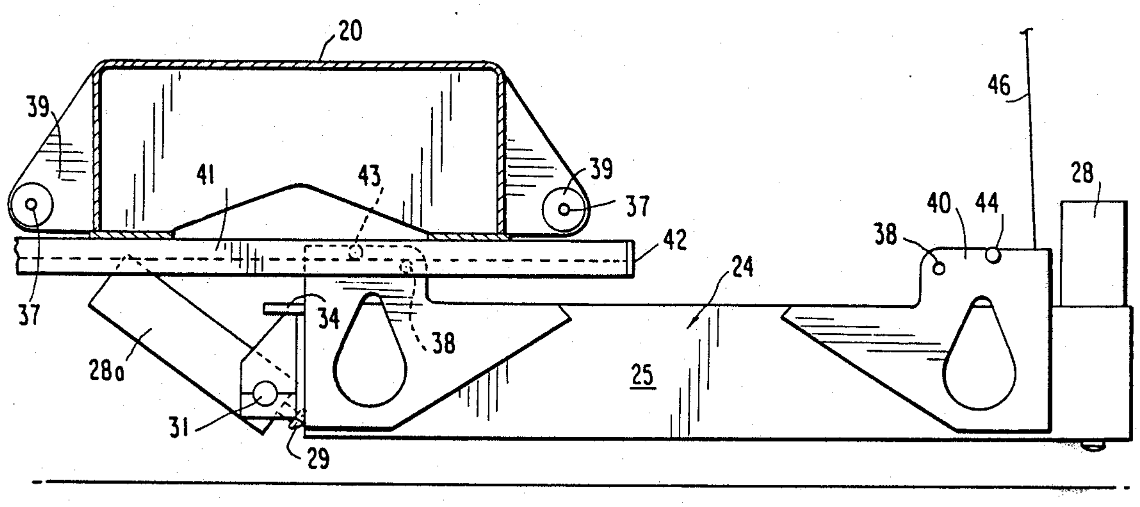
Figure 6:
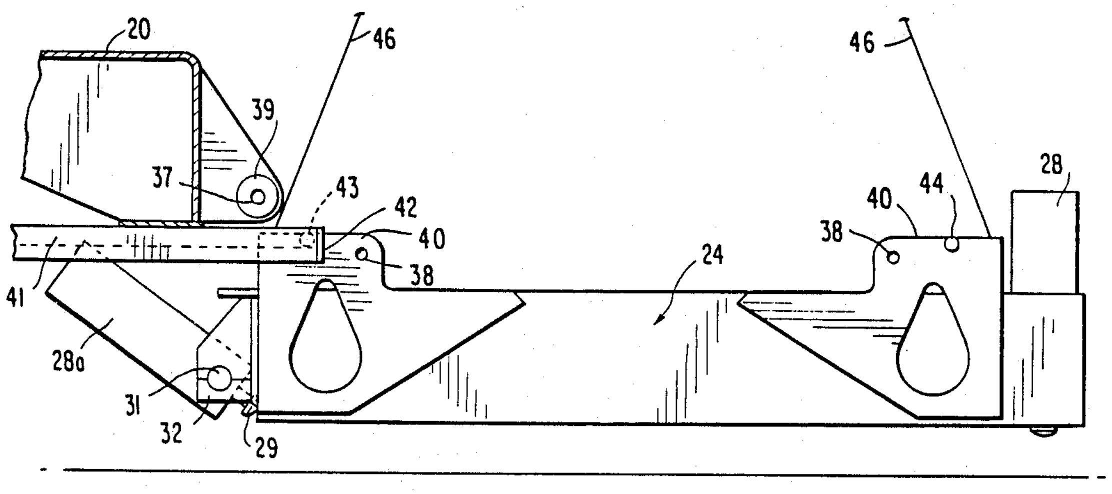

Thirdly, the cables 46 adjacent to jack cylinder 28*a* are disconnected from the outrigger assembly 24 while the downstream cables 46, FIG. 5, remain attached to the assembly. At this time, the crane superstructure can be operated in a sluing mode to slowly pull the assembly 24 laterally beneath the chassis frame 20 in one direction along the tracks 41. At the beginning of this pulling operation through the attached cables 46, the end of the assembly 24 having the dead rollers 44 thereon is lifted slightly so that the dead rollers can pass over the adjacent stop plates 42. This being accomplished, the pulling continues and the live rollers 43 will travel on the tracks 41 until they contact the downstream stop plates 42, as shown in FIG. 6. During the movement of the outrigger assembly along the tracks 41, the inclined jack cylinder 28*a* is able to pass beneath the frame 20 without interference.

Fourth and lastly in the method, the upstream lifting cables 46 are re-attached to the upstream connectors 45 of the assembly 24 and the assembly is carefully lifted off of the rails 41 and lowered to the ground or onto a supporting vehicle.

In order to re-install the outrigger box or assembly, the above method steps are carried out in reverse order. The entire method is convenient, safe, expeditious and economical from a time and labor-saving standpoint. The necessity for removing one of the heavy jack cylinders or both cylinders is entirely eliminated. Only a very slight modifying of the chassis frame and outrigger assembly is required, as described, to achieve the objectives of the invention.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A method of removing an outrigger assembly from its normal use position beneath a crane chassis frame transversely of the frame comprising unweighting opposite ends of the outrigger assembly to permit withdrawal of pins coupling the assembly to the chassis frame, lowering the released outrigger assembly onto transverse guide tracks secured to the bottom of the chassis frame, swinging one jack cylinder of the outrigger assembly downwardly, about a pivot axis on a support therefor on an end of the outrigger assembly substantially below the top of the outrigger assembly, to an inclined position below the level of the bottom of the chassis frame, shifting the outrigger assembly longitudinally on the guide tracks and transversely of the chassis frame toward the ends of the guide tracks which are downstream from the tilted jack cylinder and simultaneously supporting the downstream end of the outrigger assembly, and then lifting the outrigger assembly at both ends to remove it from the guide tracks and placing it on a supporting surface.

2. The method of claim 1, and positively arresting downstream movement of the outrigger assembly on said guide tracks by interengagement of rigid stop elements on the outrigger assembly and guide tracks prior to said lifting of the outrigger assembly to remove it from the guide tracks.

3. The method of claim 1, and the additional step of releasing a retaining element from said one jack cylinder which normally holds such cylinder upright before swinging it to the inclined position.

4. The method of claim 1, and said shifting of the outrigger assembly comprising pulling the assembly along said guide tracks by cable means operated by the crane having the chassis frame on which the outrigger assembly is mounted.

5. The method of claim 4, and said first-named unweighting said lowering, said simultaneous supporting and said last-named lifting of the outrigger assembly being carried out by cable means operated by said crane.

6. The method of claim 1, and causing roller means on the upstream end portion of the outrigger assembly to travel along the guide tracks during said shifting of the outrigger assembly longitudinally.

7. The method of claim 1, and the additional step of lifting the downstream end only of the outrigger assembly immediately prior to said shifting to enable opposing end abutment elements on the assembly and guide tracks to clear each other.

8. A method of removing an outrigger assembly from beneath a crane chassis frame to which it is attached through supporting pins, comprising unweighting the outrigger assembly and withdrawing said pins, lowering the outrigger assembly after the withdrawal of said pins onto support surfaces secured to the chassis frame at positions somewhat below the chassis frame, moving one upstream jack cylinder of the outrigger assembly to a position below the elevation of the bottom of the chassis frame downwardly, about a pivot axis on a support therefor on an end of the outrigger assembly substantially below the top of the outrigger assembly, shifting the outrigger assembly with the upstream jack cylinder in the downward position in one direction along said support surfaces transversely of the chassis frame until the outrigger assembly is substantially beyond the downstream side of the support frame with the upstream end of the outrigger assembly continuing to be supported on said surfaces, and then lifting the outrigger assembly bodily from the support surfaces, thereby completing separating the assembly from the chassis frame.

* * * * *